United States Patent
Hause (10) Patent No.: US 9,366,297 B2
(45) Date of Patent: Jun. 14, 2016

(54) SEED METERING DEVICE DRIVE SYSTEM

(75) Inventor: Kevin M. Hause, Binghamton, NY (US)

(73) Assignee: Actuant Corporation, Menomonee Falls, WI (US)

(*) Notice: Subject to any disclaimer, the term of this patent is extended or adjusted under 35 U.S.C. 154(b) by 0 days.

(21) Appl. No.: 14/111,601

(22) PCT Filed: Apr. 6, 2012

(86) PCT No.: PCT/US2012/032484
§ 371 (c)(1),
(2), (4) Date: Oct. 14, 2013

(87) PCT Pub. No.: WO2013/106026
PCT Pub. Date: Jul. 18, 2013

(65) Prior Publication Data
US 2014/0057728 A1 Feb. 27, 2014

Related U.S. Application Data

(60) Provisional application No. 61/475,509, filed on Apr. 14, 2011.

(51) Int. Cl.
*F16D 13/08* (2006.01)
*A01C 19/02* (2006.01)
(Continued)

(52) U.S. Cl.
CPC ............... *F16D 11/00* (2013.01); *A01C 19/02* (2013.01); *F16C 1/00* (2013.01); *F16D 1/101* (2013.01); *F16D 13/08* (2013.01); *F16D 27/105* (2013.01); *F16D 2001/102* (2013.01)

(58) Field of Classification Search
CPC .................................................. F16D 27/105

USPC ........................................... 192/26, 23, 84.81
See application file for complete search history.

(56) References Cited

U.S. PATENT DOCUMENTS 1,871,528 A * 8/1932 Joline ............................. 464/53
6,672,228 B1 1/2004 Groelz et al.
(Continued)

FOREIGN PATENT DOCUMENTS

CN 2139770 8/1993
CN 2679986 2/2005
WO 2006/065032 A1 6/2006

OTHER PUBLICATIONS

International Search Report and Written Opinion under date of Jun. 20, 2012 in connection with PCT/US2012/032484.
(Continued)

*Primary Examiner* — Richard Lorence
*Assistant Examiner* — Lillian Nguyen
(74) *Attorney, Agent, or Firm* — Michael Best & Friedrich LLP (57) ABSTRACT

A system for transmitting power from a drive shaft to a seed meter shaft of a seeder is disclosed. The system comprises a first transmission that connects to one of the drive shaft and the seed meter shaft. The first transmission also connects to a clutch assembly. The clutch assembly connects to a flexible drive shaft assembly, and the flexible drive shaft assembly connects to a second transmission. The second transmission connects to the other of the drive shaft and the seed meter shaft. The clutch assembly is detachable from the first transmission and the flexible drive shaft assembly and the flexible drive shaft assembly is directly connectable to the first transmission.

20 Claims, 6 Drawing Sheets

(51) Int. Cl.
    *F16C 13/00*      (2006.01)
    *F16D 11/00*      (2006.01)
    *F16C 1/00*      (2006.01)
    *F16D 1/10*      (2006.01)
    *F16D 27/105*      (2006.01)

(56) References Cited

U.S. PATENT DOCUMENTS

| | | | |
|---|---|---|---|
| 6,729,250 | B2 | 5/2004 | Friestad et al. |
| 7,467,698 | B2 | 12/2008 | Dillman |
| 7,497,176 | B2 | 3/2009 | Dillman |
| 7,571,688 | B1 | 8/2009 | Friestad et al. |
| 7,717,048 | B2 | 5/2010 | Peterson, Jr. et al. |
| 2009/0090283 | A1 | 4/2009 | Riewerts |
| 2010/0300342 | A1 | 12/2010 | Peterson et al. |

OTHER PUBLICATIONS

First Office Action from the State Intellectual Property Office of the People's Republic of China for Application No. 201280028778.2 dated Jun. 25, 2015 (20 pages).

Second Office Action from the State Intellectual Property Office of China dated Mar. 16, 2016 (5 pages).

\* cited by examiner

SEED METERING DEVICE DRIVE SYSTEM

CROSS-REFERENCE TO RELATED APPLICATIONS

This application represents the national stage entry of PCT International Application No. PCT/US2012/032484 filed on Apr. 6, 2012 and claims the benefit of U.S. Provisional Application No. 61/475,509, filed Apr. 14, 2011, the disclosure of each application is hereby incorporated by reference for all purposes.

STATEMENT CONCERNING FEDERALLY SPONSORED RESEARCH OR DEVELOPMENT

Not applicable.

FIELD OF THE INVENTION

This invention relates to power trains for seeders, particularly seeder power trains having easily removable and interchangeable components.

BACKGROUND OF THE INVENTION

Agricultural seeding implements, such as row crop planting implements and the like, typically include multiple seed metering devices that separate seeds from one another such that individual seeds can be dispensed at consistent intervals. Such seed metering devices can take various forms. For example, some seed metering devices use a vacuum to direct seeds, while others employ seed-selecting "fingers". Regardless of their specific construction, all the seed metering devices on a planting implement are typically driven by a common drive shaft. Moreover, each seed metering device connects to a separate drive system that transmits power from the common drive shaft to the seed metering device.

The drive systems described above typically include a flexible shaft to transmit power between the common drive shaft and the seed metering device. Such a flexible shaft permits relative motion between a portion of the implement supporting the drive shaft and a planting unit supporting the seed metering device to facilitate, e.g., planting on uneven surfaces. In some cases, the drive system also includes a clutch that is disengageable to disconnect the drive shaft and the seed metering device.

However, these drive systems also have a number of drawbacks. For example, the drive system components are typically largely integrated with one another. In particular, the clutch can be positioned in a gearbox that connects to the common drive shaft. This increases the difficulty of removing the clutch from the gearbox if it or another component within the gearbox fails. Similarly, the clutch cannot be easily removed from the drive system if an operator wishes to remove it altogether. Other components of the drive train are also interconnected in similar manners, thereby making repair and/or replacement of individual components difficult.

Considering the above drawbacks, what is needed in the art is a seed meter drive system having one or more easily removable and/or replaceable components.

SUMMARY OF THE INVENTION

In one aspect, the present invention provides a system for transmitting power from a drive shaft to a seed meter shaft of a seeder. The system comprises a first transmission that includes a first transmission coupling connected to one of the drive shaft and the seed meter shaft so as to rotate as the one of the drive shaft and the seed meter shaft rotates. The first transmission further includes a first connecting member of a first connection interface. The system further comprises a clutch assembly that includes a first clutch coupling connected to the first transmission coupling so as to rotate as the first transmission coupling rotates. The clutch assembly further includes a second clutch coupling and a clutch connecting the first clutch coupling and the second clutch coupling such that the second clutch coupling is selectively connected to the first clutch coupling so as to selectively rotate as the first clutch coupling rotates. The clutch assembly further includes a second connecting member of the first connection interface. The second connecting member matingly engages the first connecting member to secure the first transmission to the clutch assembly. The clutch assembly further includes a first connecting member of a second connection interface. The system further comprises a flexible shaft assembly that includes a first shaft coupling connected to the second clutch coupling so as to rotate as the second clutch coupling rotates. A flexible shaft connects to the first shaft coupling so as to rotate as the first shaft coupling rotates, and a second shaft coupling connects to the flexible shaft so as to rotate as the flexible shaft rotates. The flexible shaft assembly further includes a second connecting member of the second connection interface. The second connecting member matingly engages the first connecting member of the second connection interface to secure the flexible drive shaft assembly to the clutch assembly. The system further comprises a second transmission that includes a second transmission coupling connected to the second shaft coupling so as to rotate as the second shaft coupling rotates. The second transmission coupling is connected to the other of the drive shaft and the seed meter shaft so as to rotate as the other of the drive shaft and the seed meter shaft rotates. The second connecting member of the first connection interface is detachable from the first connecting member of the first connection interface and the second connecting member of the second connection interface is detachable from the first connecting member of the second connection interface. The second connecting member of the second connection interface is matingly engageable with the first connecting member of the first connection interface to secure the flexible shaft assembly directly to the first transmission and directly connect the first transmission coupling and the first shaft coupling.

In another aspect, the present invention provides a system for transmitting power from a drive shaft to a seed meter shaft of a seeder. The system comprises a first transmission that includes a first transmission coupling connected to one of the drive shaft and the seed meter shaft so as to rotate as the one of the drive shaft and the seed meter shaft rotates. The system further comprises a clutch assembly that includes a first clutch coupling connected to the first transmission coupling so as to rotate as the first transmission coupling rotates. The first clutch coupling has a first cross-sectional shape. The clutch assembly further includes a second clutch coupling and a clutch connecting the first clutch coupling and the second clutch coupling such that the second clutch coupling is selectively connected to the first clutch coupling so as to selectively rotate as the first clutch coupling rotates. The system further includes a flexible shaft assembly that includes a first shaft coupling connected to the second clutch coupling so as to rotate as the second clutch coupling rotates. The first shaft coupling has a second cross-sectional shape. The flexible shaft assembly further includes a flexible shaft connected to the first shaft coupling so as to rotate as the first shaft coupling rotates and a second shaft coupling connected to the flexible shaft so as to rotate as the flexible shaft rotates. The system further comprises a second transmission that includes a second transmission coupling connected to the second shaft coupling so as to rotate as the second shaft coupling rotates. The second transmission coupling is connected to the other of the drive shaft and the seed meter shaft so as to rotate as the other of the drive shaft and the seed meter shaft rotates. The first clutch coupling is detachable from the first transmission coupling and the first shaft coupling is detachable from the second clutch coupling, and the first cross-sectional shape and the second cross-sectional shape are generally identical to permit the first shaft coupling to directly connect to the first transmission coupling.

In yet another aspect, the present invention provides a system for transmitting power from a drive shaft to a seed meter shaft of a seeder. The system comprises a first transmission that includes a first transmission coupling connected to one of the drive shaft and the seed meter shaft so as to rotate as the one of the drive shaft and the seed meter shaft rotates. The system further comprises a flexible shaft assembly that includes a first shaft coupling connected to the first transmission coupling so as to rotate as the first transmission coupling rotates. The first shaft coupling has a first cross-sectional shape. The flexible shaft assembly further includes a flexible shaft connected to the first shaft coupling so as to rotate as the first shaft coupling rotates and a second shaft coupling connected to the flexible shaft so as to rotate as the flexible shaft rotates. The second shaft coupling has a second cross-sectional shape. The system further comprises a second transmission that includes a second transmission coupling connected to the second shaft coupling so as to rotate as the second shaft coupling rotates. The second transmission coupling is connected to the other of the drive shaft and the seed meter shaft so as to rotate as the other of the drive shaft and the seed meter shaft rotates. The first cross-sectional shape and the second cross-sectional shape are generally identical to permit the flexible shaft assembly to detach from the first transmission and the second transmission and reconnect to the first transmission and the second transmission in an opposite orientation.

The foregoing and other aspects of the invention will appear in the detailed description which follows. In the description, reference is made to the accompanying drawings which illustrate a preferred embodiment of the invention.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENT

Referring to FIGS. 1-6, a seed metering device drive system 20 according to the present invention includes one or more components that are detachable and easily replaceable. In general, the seed metering device drive system 20 includes a drive shaft transmission or gearbox 22 that is driven by a drive shaft 10 of an agricultural implement (not shown). The drive shaft gearbox 22 drives a clutch assembly 24 that is operable to selectively transmit power from the gearbox 22 to a flexible shaft assembly 26. The flexible shaft assembly 26 drives a seed meter transmission or gearbox 28 that in turn drives a seed meter shaft 12 of the associated seed meter (not shown). The following paragraphs further describe these components of the drive system 20 as well as features that facilitate easy detachability.

Figure 1:
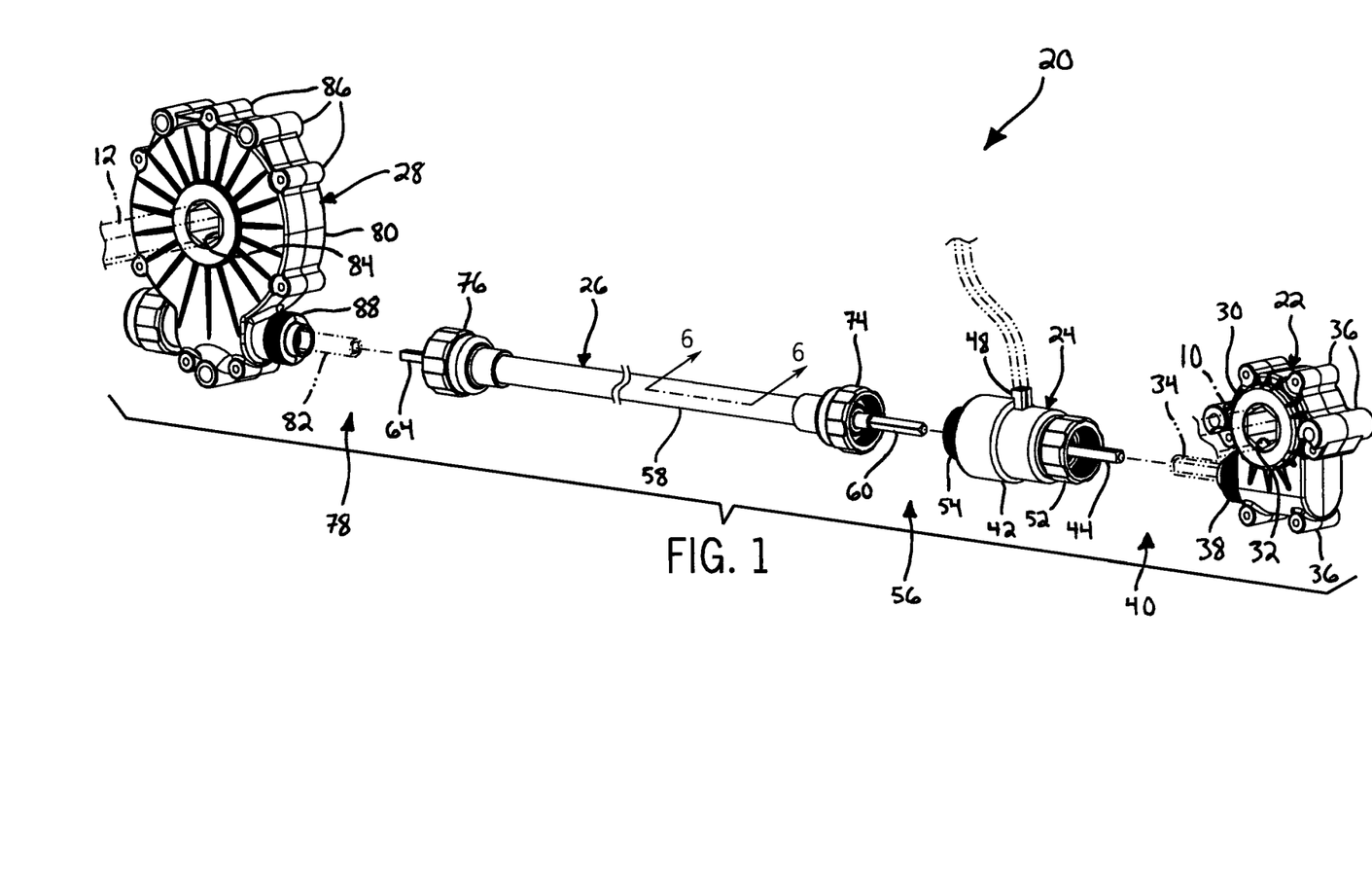
FIG. 1 is an exploded perspective view of a seed metering device drive system according to the present invention.
Figures 2, 3:
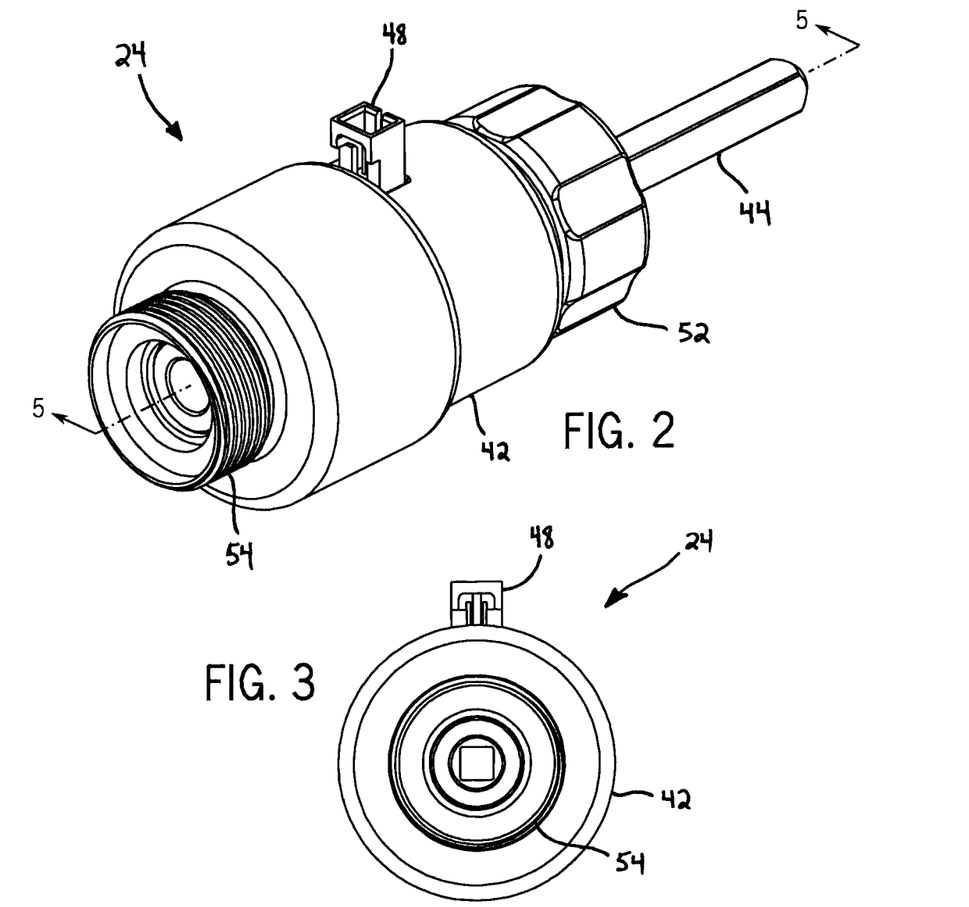
FIG. 2 is a perspective view of a clutch assembly of the seed metering device drive system of FIG. 1.
FIG. 3 is a front view of the clutch assembly of FIG. 2.
Figure 4:
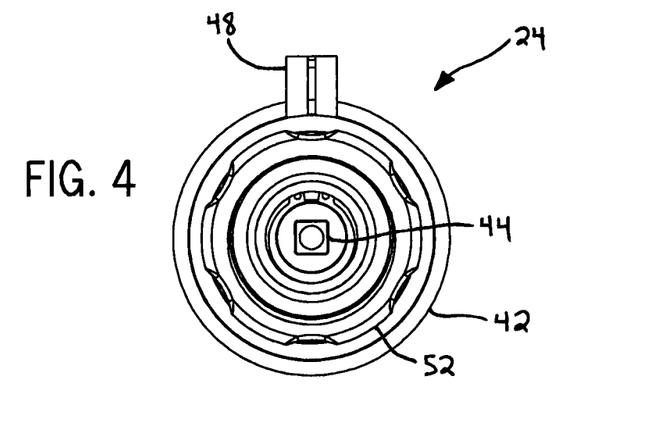
FIG. 4 is a rear view of the clutch assembly of FIG. 2.

Referring specifically to FIG. 1, the drive shaft gearbox 22 includes a gearbox housing 30 that rotatably supports several internal components that transmit the rotary power of the drive shaft 10. In particular, the gearbox housing 30 supports a drive shaft gearbox input coupling 32 that connects to and is rotated by the drive shaft 10. In some embodiments and as shown in the figures, the input coupling 32 includes a hexagonal internal passageway that receives the drive shaft 10. Moreover, the input coupling 32 may be a worm that engages and drives a worm gear (not shown) within the drive shaft gearbox 22.

Regardless of its specific construction, the drive shaft gearbox input coupling 32 drives a rotatable drive shaft gearbox output coupling 34. In some embodiments and as shown in the figures, the output coupling 34 has an internal passageway with a square cross-sectional shape to engage a component of the clutch assembly 24 as described in further detail below. Alternatively, the internal passageway of the output coupling 34 may have a different cross-sectional shape provided that it is capable of engaging the clutch assembly 24.

In addition to the components the gearbox housing 30 accommodates as described above, the housing 30 also includes a plurality of mounting features 36 (e.g., flanges having passageways for receiving fasteners) to secure the drive shaft gearbox 22 relative to the agricultural implement. The housing 30 also defines a first connecting member 38 of a first connection interface 40 proximate the output coupling 34. In some embodiments and as shown in the figures, the first connecting member 38 is an externally threaded surface. As described in further detail below, the first connecting member 38 connects to the clutch assembly 24.

Figures 5, 6:
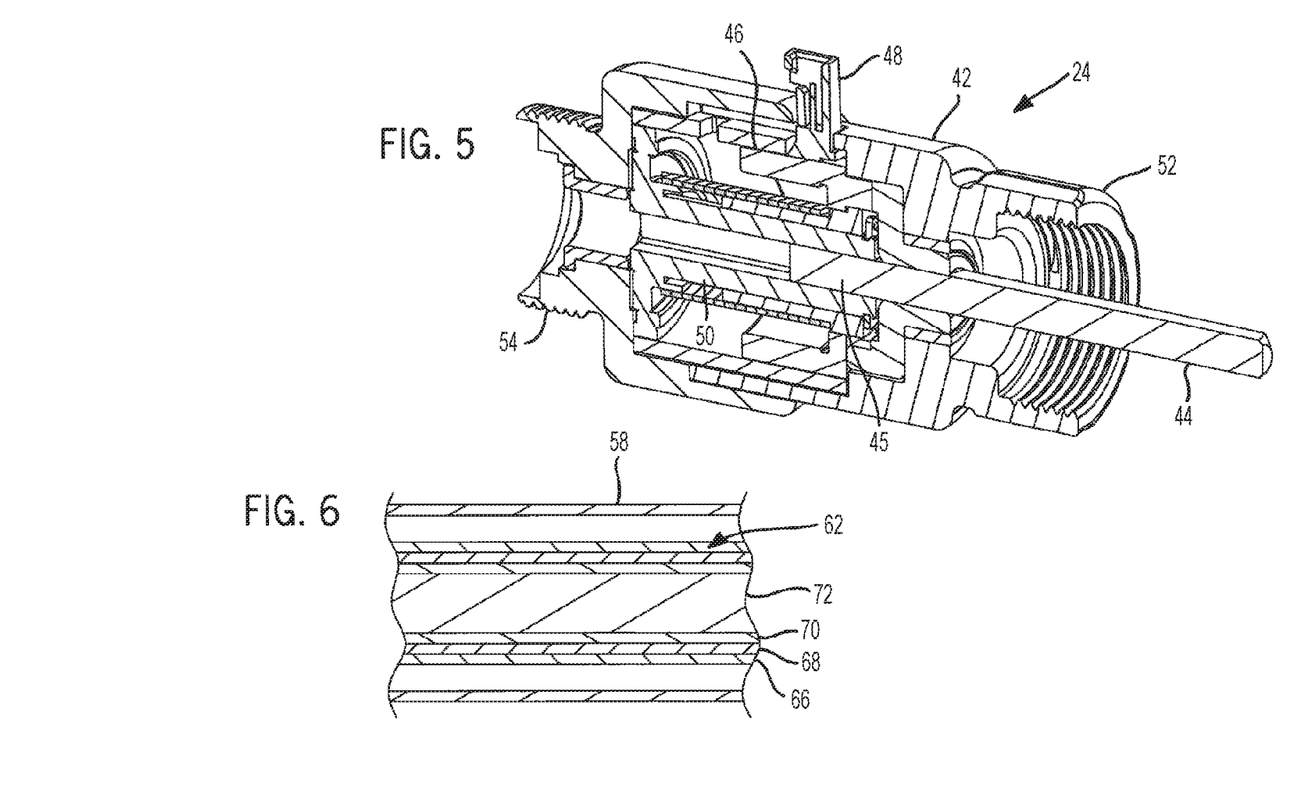
FIG. 5 is a section view of the clutch assembly along line 5-5 of FIG. 2.
FIG. 6 is a section view of a flexible shaft of the seed metering device drive system along line 6-6 of FIG. 1.
Figure 7:
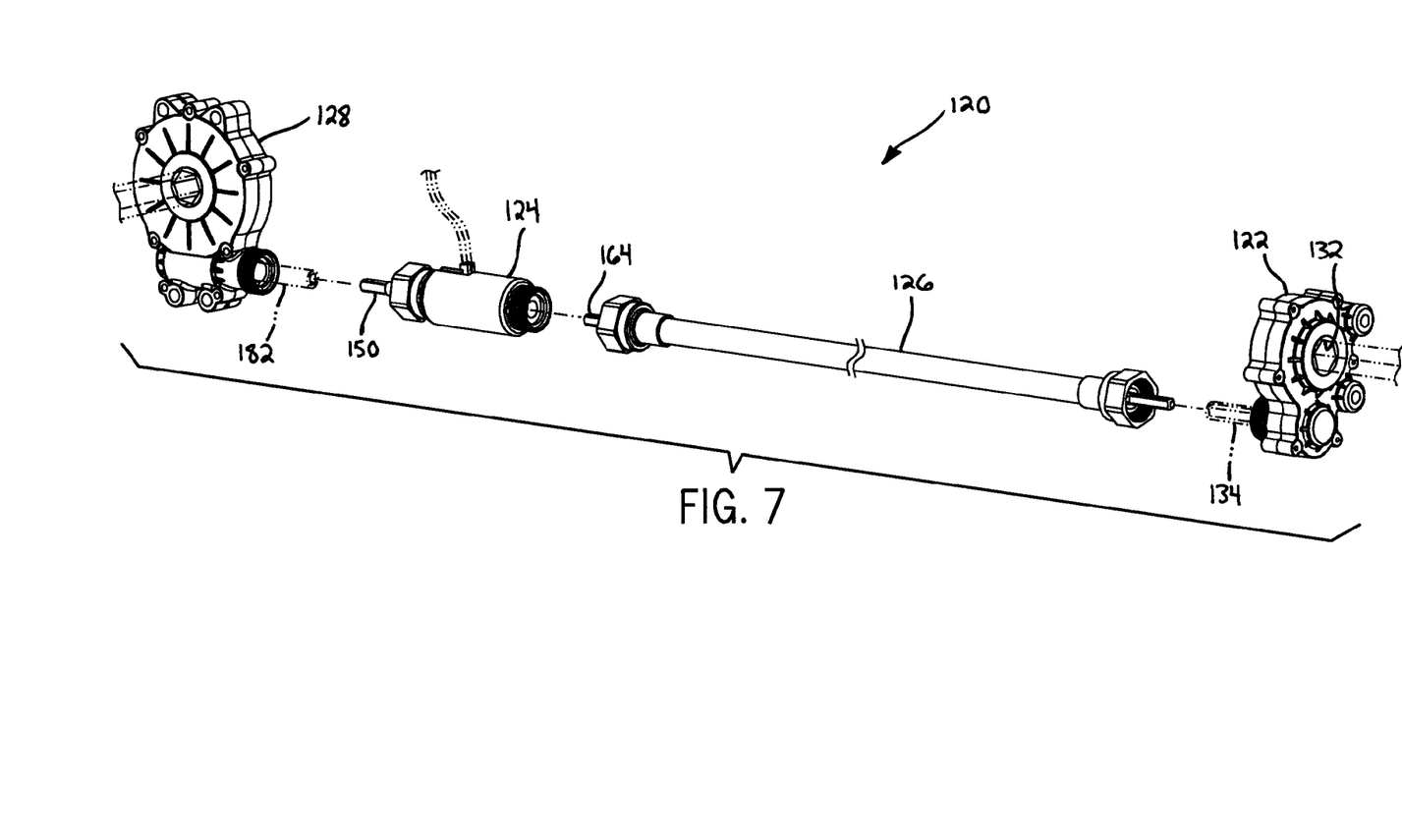
FIG. 7 is an exploded perspective view of a second embodiment of a seed metering device drive system according to the present invention.
Figure 8:
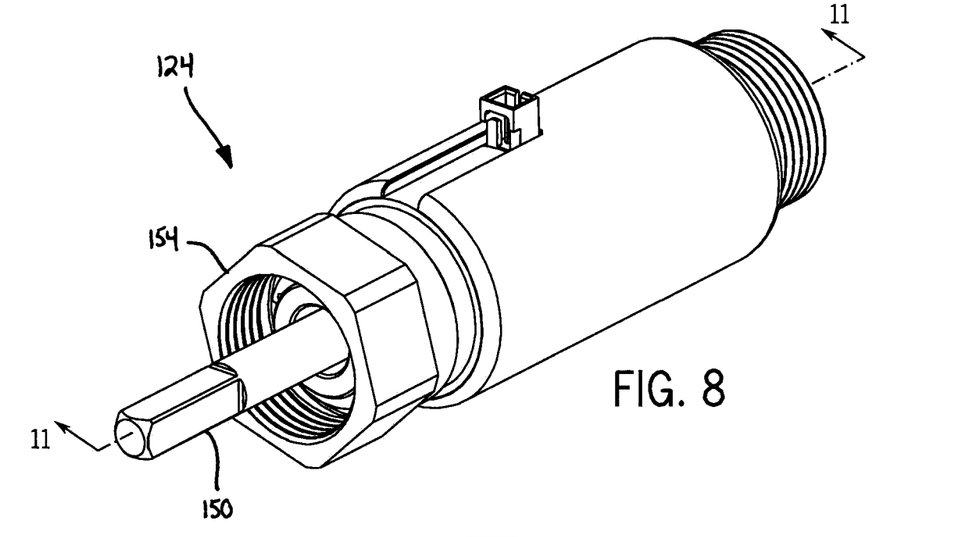
FIG. 8 is a perspective view of a clutch assembly of the seed metering device drive system of FIG. 7.
Figure 9:
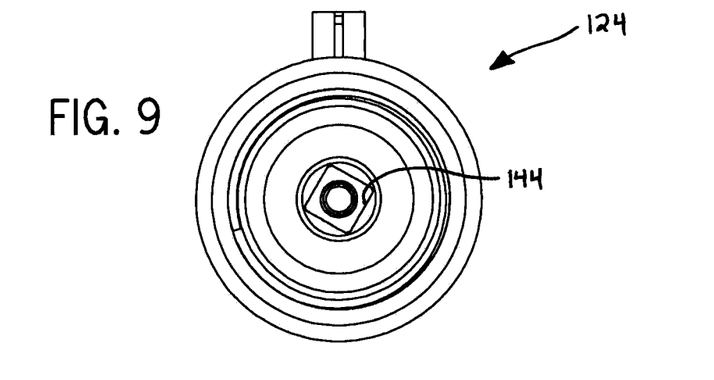
FIG. 9 is a front view of the clutch assembly of FIG. 8.
Figure 10:
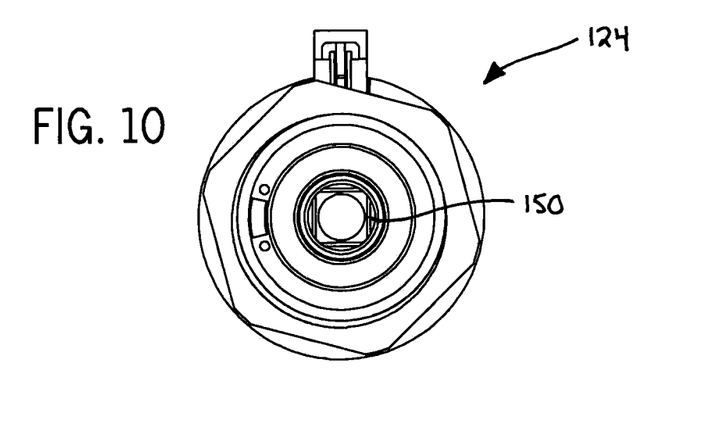
FIG. 10 is a rear view of the clutch assembly of FIG. 8.
Figure 11:
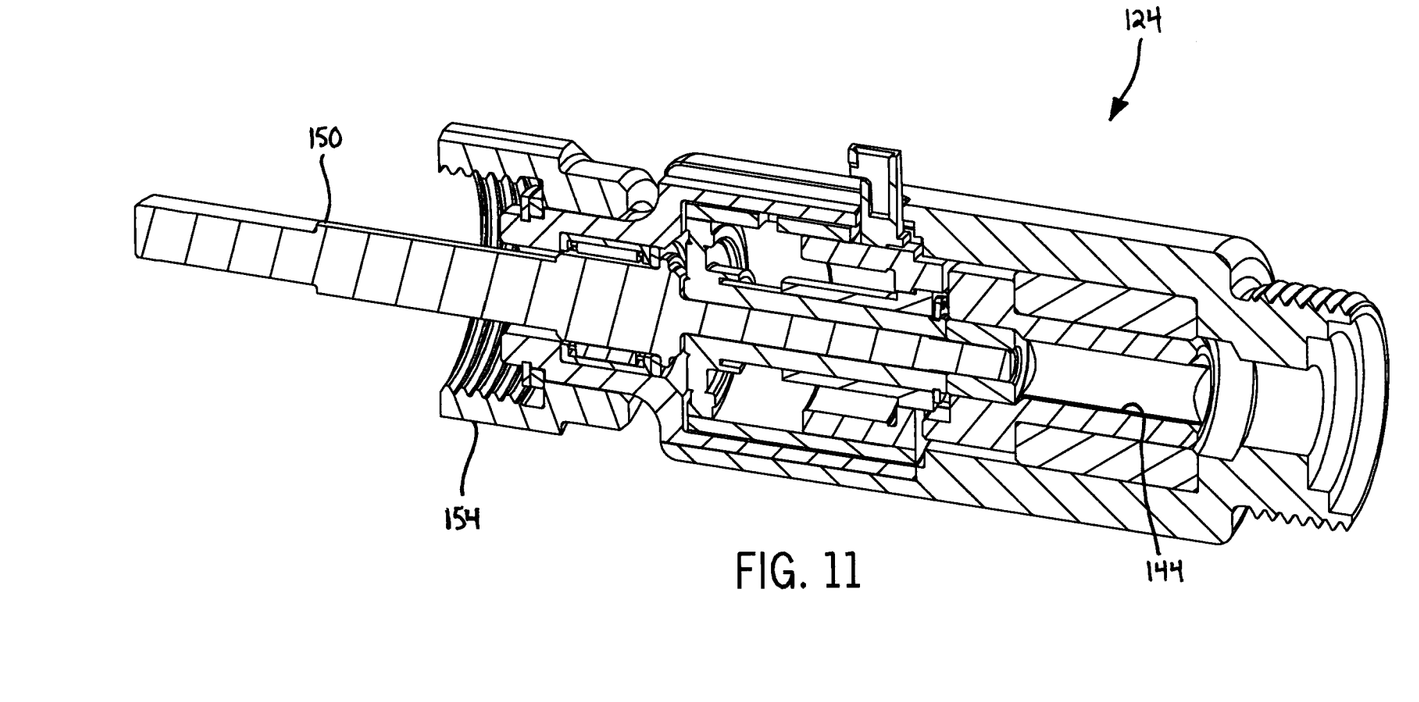
FIG. 11 is a section view of the clutch assembly along line 11-11 of FIG. 8.

Referring now to FIGS. 1-5 and particularly FIG. 5, the clutch assembly 24 includes a clutch housing 42 that supports several internal power-transmitting components. In particular, the clutch housing 42 supports a rotatable clutch input coupling 44 that connects to and is driven by the drive shaft gearbox output coupling 34. In some embodiments and as shown in the figures, the clutch input coupling 44 has a square cross-sectional shape that is received in the internal passageway of the drive shaft gearbox output coupling 34. Alternatively, the clutch input coupling 44 may have a different cross-sectional shape that it is capable of being received in the internal passageway of the drive shaft gearbox output coupling 34 and driven by the drive shaft gearbox output coupling 34. As another alternative, the drive shaft gearbox output coupling 34 may have a positive shape (e.g., a square cross-sectional shaped shaft) and the clutch input coupling 44 may have the inverse shape (e.g., a square cross-sectional passageway).

The clutch input coupling 44 also serves as the input to a clutch 46. The clutch 46 may be of any appropriate type, such as an electrically-actuated wrap spring clutch or the like, provided that it can be connected to controls (e.g., via an input terminal 48) for selectively engaging and disengaging the device. As such, the clutch 46 may be engaged and disengaged to selectively drive the seed meter shaft 12 via the drive shaft 10.

The clutch 46 connects to and drives or, as shown in the figures, integrally connects to and drives a rotatable clutch output coupling 50. In some embodiments and as shown in the figures, the clutch output coupling 50 has an internal passageway with a square cross-sectional shape to engage a component of the flexible shaft assembly 26. This cross-sectional shape is preferably generally identical to that of the drive shaft gearbox output coupling 34 for reasons described in further detail below. As shown in the figures, the clutch output coupling 50 may receive an end portion 45 of the clutch input coupling 44. However, this portion 45 of the input coupling 44 preferably has a circular cross-sectional shape such that the input coupling 44 selectively drives the output coupling 50 via the clutch 46.

In addition to the internal components described above, the clutch housing 42 also supports a second connecting member 52 of the first connection interface 40. In some embodiments and as shown in the figures, the second connecting member 52 is an integrally mounted swivel nut having an internally threaded surface with the same thread size and pitch as the first connecting member 38. As such, the second connecting member 52 may be rotated relative to the clutch housing 42 in one direction to connect to the first connecting member 38 and thereby secure the clutch assembly 24 to the drive shaft gearbox 22. Conversely, the second connecting member 52 may be rotated relative to the clutch housing 42 in the opposite direction to disconnect from the first connecting member 38 and thereby detach the clutch assembly 24 and the drive shaft gearbox 22.

Regardless of their specific shapes, the second connecting member 52 matingly engages the first connecting member 38. That is, the first connecting member 38 and the second connecting member 52 have appropriate shapes and/or features to permit the drive shaft gearbox 22 and the clutch assembly 24 to be detachably secured to one another.

At the opposite end from the second connecting member 52, the housing 42 includes a first connecting member 54 of a second connection interface 56. In some embodiments and as shown in the figures, the first connecting member 54 is an externally threaded surface. In any case, the first connecting member 54 connects to the flexible shaft assembly 26 as described in further detail below.

Referring now to FIGS. 1 and 6, the flexible shaft assembly 26 includes a flexible shaft housing 58 that rotatably supports several internal power-transmitting components. In particular, the flexible shaft housing 58 rotatably supports a flexible shaft input coupling 60 that connects to and is driven by the clutch output coupling 50. In some embodiments and as shown in the figures, the flexible shaft input coupling 60 has a square cross-sectional shape that is received in the internal passageway of the clutch output coupling 50. Alternatively, the flexible shaft input coupling 60 may have a different cross-sectional shape that it is capable of being received in the internal passageway of the clutch output coupling 50 and driven by the clutch output coupling 50. As another alternative, the clutch output coupling 50 may have a positive shape (e.g., a square cross-sectional shaped shaft) and the flexible shaft input coupling 60 may have the inverse shape (e.g., a square cross-sectional passageway).

Referring particularly to FIG. 6, the flexible shaft input coupling 60 connects to a flexible core or shaft 62 via, e.g., a crimped connection (not shown). The flexible shaft 62 may be of any appropriate type, such as the flexible shafts produced by Elliott Manufacturing of Binghamton, N.Y. In general, the flexible shaft 62 is a semi-flexible component that transmits power between the drive shaft gearbox 22 and the seed meter gearbox 28. As used herein, the term "semi-flexible" and variations thereof mean that a component can support a torsional load, but buckles when subjected to axial compressive and side bending loads, and can stretch when subjected to an axial tension load. In addition, such components can significantly change shape without experiencing plastic deformation when first placed in a taut configuration and then subjected to compressive and/or bending loads. Stated another way, a longitudinal axis of the component can extend along one or more significant curves without subjecting the component to plastic deformation, and the component can be bent into a curved shape so as to exert a rotary driving torque about its axis from one end to the other while maintaining the curved shape. Stated yet another way, the semi-flexible structure permits the flexible shaft 62 to rotate while connecting two couplings that are misaligned (i.e., the flexible shaft input coupling 60 and a flexible shaft output coupling 64 connected to the opposite side of the shaft 62).

In some embodiments and as shown in the figures, the flexible shaft 62 has an overall diameter of approximately 0.25 inches and comprises several layers of wires 66, 68, and 70 helically wound over a central wire 72 and connected at their ends via, e.g., a welded connection (not shown). The central wire 72 may itself comprise multiple layers of helically wound wires (not shown). Furthermore, two of the layers of wires 66 and 70 may be wound in a first direction and the other layer of wires 68 may be wound in a second direction to permit the flexible shaft 62 to transmit torque if rotated in either direction.

As described briefly above, the flexible shaft 62 connects to a rotatable flexible shaft output coupling 64 opposite the flexible shaft input coupling 60. The flexible shaft 62 may connect to the flexible shaft output coupling 64 via, e.g., a crimped connection (not shown). In some embodiments and as shown in the figures, the flexible shaft output coupling 64 has a square cross-sectional shape that is generally identical to the shape of the flexible shaft input coupling 60. This construction, in addition to other features of the drive system 20, permits the flexible shaft assembly 26 to be connected to the clutch assembly 24 and the seed meter gearbox 28 in the opposite orientation. That is, the flexible shaft input coupling 60 could alternatively be connected and positioned to serve as the output coupling and vice versa.

In addition to the internal components described above, the shaft housing 58 also supports a second connecting member 74 of the second connection interface 56. In some embodiments and as shown in the figures, the second connecting member 74 is a rotatably mounted swivel nut having an internally threaded surface with the same thread size and pitch as the first connecting member 54 of the second connection interface 56. As such, the second connecting member 74 may be rotated relative to the shaft housing 58 in one direction to connect to the first connecting member 54 and thereby secure the flexible shaft assembly 26 to the clutch assembly 24. Conversely, the second connecting member 74 may be rotated relative to the shaft housing 58 in the opposite direction to disconnect from the first connecting member 54 and thereby detach the flexible shaft assembly 26 and the clutch assembly 24.

Regardless of their specific shapes, the second connecting member 74 matingly engages the first connecting member 54 of the second connection interface 56. That is, the first connecting member 54 and the second connecting member 74 have appropriate shapes and/or features to permit the clutch assembly 24 and the flexible shaft assembly 26 to be detachably secured to one another. Such mating features, in addition to the mating features of the first connection interface 40, permit the clutch assembly 24 to be easily removed and replaced in the case of component failure. Moreover, the first connection interface 40 and the second connection interface 56 preferably have generally identical mating features (e.g., the same thread size and pitch) to permit the flexible shaft assembly 26 to be connected directly to the drive shaft gearbox 22. In this case, the drive shaft gearbox output coupling 34 directly engages and drives the flexible shaft input coupling 60. Such a configuration may be useful if the clutch assembly 24 fails during use and a replacement assembly is not readily available.

At the opposite end, the flexible shaft housing 58 supports a first connecting member 76 of a third connection interface 78. In some embodiments and as shown in the figures, the first connecting member 76 is a rotatably mounted swivel nut having an internally threaded surface with the same thread size and pitch as the second connecting member 74 of the second connection interface 56. Such a construction further permits the flexible shaft assembly 26 to be connected to the clutch assembly 24 and the seed meter gearbox 28 in the opposite orientation as described above.

Referring again specifically to FIG. 1, the seed meter gearbox 28 includes a gearbox housing 80 that rotatably supports several internal components that transmit the rotary power received from the flexible shaft assembly 26. In particular, the gearbox housing 80 includes a rotatable seed meter gearbox input coupling 82. In some embodiments and as shown in the figures, the input coupling 82 has an internal passageway with a square cross-sectional shape to receive the flexible shaft output coupling 64. Alternatively, the input coupling 82 may have a passageway with a different shape that it is capable of drivingly receiving the flexible shaft output coupling 64. As another alternative, the input coupling 82 may have a positive shape (e.g., a square cross-sectional shaped shaft) and the flexible shaft output coupling 64 may have the inverse shape (e.g., a square cross-sectional passageway).

The input coupling 82 may be a worm or may drive a worm that engages and drives a worm gear within the seed meter gearbox 28. The worm gear may drive or may itself be a rotatable seed meter gearbox output coupling 84 that engages and drives the seed meter shaft 12. In some embodiments and as shown in the figures, the output coupling 84 includes a hexagonal internal passageway that receives the seed meter shaft 12.

In addition to the components the gearbox housing 80 accommodates as described above, the housing 80 also includes a plurality of mounting features 86 (e.g., flanges having passageways for receiving fasteners) to secure the seed meter gearbox 28 relative to the agricultural implement. The housing 80 also defines a second connecting member 88 of the third connection interface 78 proximate the input coupling 82. In some embodiments and as shown in the figures, the second connecting member 88 is an externally threaded surface having the same thread size and pitch as the first connecting member 76. In any case, the second connecting member 88 matingly engages the first connecting member 76 of the third connection interface 78.

Turning now to FIGS. 7-11, a second embodiment of a seed metering device drive system 120 according to the present invention will briefly be described. The seed metering device drive system 120 is generally similar to the system 20 shown in FIGS. 1-6 and advantageously includes several components that are detachable and easily replaceable. However, the second embodiment of the system 120 has several structural differences from the first embodiment. First, the drive shaft gearbox 122 is a parallel-shaft helical gear gearbox; that is, the input and output couplings 132 and 134 are helical gears having parallel axes of rotation. Second, the flexible shaft assembly 126 is larger than that of the first embodiment of the system 20 to transmit larger torques. In particular, the flexible shaft has an overall diameter of approximately 0.375 inches. Finally, the clutch assembly 124 connects to the opposite end of the flexible shaft assembly 126 compared to the first embodiment of the system 20. In particular, the clutch assembly 124 connects the flexible shaft assembly 126 to the seed meter gearbox 128. To this end, the clutch input coupling 144 receives the flexible shaft output coupling 164 (e.g., the clutch input coupling 144 includes a square passageway to receive the square output coupling 164), and the clutch output coupling 150 is received in the seed meter gearbox input coupling 182. Similarly, the second connecting member 154 of the clutch assembly 124 may be a rotatably mounted swivel nut.

From the above description, it should be apparent that the present invention provides a seed meter drive system having one or more easily removable and/or replaceable components. In the embodiment shown in the figures, both the clutch assembly and the flexible shaft assembly are easily detachable and replaceable. Similarly and in some embodiments, the orientation of the flexible shaft may be reversed relative to the drive shaft gearbox and the seed meter gearbox. Moreover, in some cases the shapes and/or features of connection interfaces between components permits the flexible shaft assembly to be directly connected to the drive shaft gearbox if the clutch assembly is removed.

A preferred embodiment of the invention has been described in considerable detail. Many modifications and variations to the preferred embodiment described will be apparent to a person of ordinary skill in the art. Therefore, the invention should not be limited to the embodiment described, but should be defined by the claims that follow.

I claim:
1. A system for transmitting power from a drive shaft to a seed meter shaft of a seeder, comprising:
   a first transmission including:
      a first transmission coupling connected to one of the drive shaft or the seed meter shaft so as to rotate as the one of the drive shaft or the seed meter shaft rotates;
      a first connecting member of a first connection interface;
   a clutch assembly including:
      a first clutch coupling connected to the first transmission coupling so as to rotate as the first transmission coupling rotates;
      a second clutch coupling;
      a clutch connecting the first clutch coupling and the second clutch coupling such that the second clutch coupling is selectively connected to the first clutch coupling so as to selectively rotate as the first clutch coupling rotates;
      a second connecting member of the first connection interface, the second connecting member of the first connection interface matingly engaging the first con- necting member of the first connection interface to secure the first transmission to the clutch assembly;

a first connecting member of a second connection interface;

a flexible shaft assembly including:
  a first shaft coupling connected to the second clutch coupling so as to rotate as the second clutch coupling rotates;
  a flexible shaft connected to the first shaft coupling so as to rotate as the first shaft coupling rotates;
  a second shaft coupling connected to the flexible shaft so as to rotate as the flexible shaft rotates;
  a second connecting member of the second connection interface matingly engaging the first connecting member of the second connection interface to secure the flexible drive shaft assembly to the clutch assembly;

a second transmission including:
  a second transmission coupling connected to the second shaft coupling so as to rotate as the second shaft coupling rotates, and the second transmission coupling being connected to the other of the drive shaft or the seed meter shaft so as to rotate as the other of the drive shaft or the seed meter shaft rotates; and wherein the second connecting member of the first connection interface is detachable from the first connecting member of the first connection interface, the second connecting member of the second connection interface is detachable from the first connecting member of the second connection interface, the second connecting member of the second connection interface is matingly engageable with the first connecting member of the first connection interface to secure the flexible shaft assembly directly to the first transmission and directly connect the first transmission coupling and the first shaft coupling, and wherein the clutch assembly is substantially outside of the first transmission and the second transmission.

2. The system of claim 1, wherein one of the first connecting member of the first connection interface and the second connecting member of the first connection interface is a threaded surface and the other of the first connecting member of the first connection interface or the second connecting member of the first connection interface is a threaded swivel nut.

3. The system of claim 1, wherein first connecting member of the first connection interface and the first connecting member of the second connection interface define a set of first connecting members, the second connecting member of the first connection interface and the second connecting member of the second connection interface define a set of second connecting members, and one of the set of first connecting members and the set of second connecting members are threaded surfaces and the other of the set of first connecting members and the set of second connecting members are threaded swivel nuts.

4. The system of claim 1, wherein the first clutch coupling and the first shaft coupling define a set of first couplings, the first transmission coupling and the second clutch coupling define a set of second couplings, and one of the set of first couplings and the set of second couplings have a cross-sectional shape and the other of the set of first couplings and the set of second couplings have an inverse shape of the cross-sectional shape.

5. The system of claim 1, wherein one of the first transmission coupling and the first clutch coupling is a square shaft and the other of the first transmission coupling and the first clutch coupling is a square shaft receiver.

6. The system of claim 1, wherein the first clutch coupling and the first shaft coupling define a set of first couplings, the first transmission coupling and the second clutch coupling define a set of second couplings, and one of the set of first couplings and the set of second couplings are square shafts and the other of the set of first couplings and the set of second couplings are square shaft receivers.

7. The system of claim 1, wherein the flexible shaft assembly further includes a first connecting member of a third connection interface and the second transmission includes a second connecting member of the third connection interface, and the first connecting member of the third connection interface and the second connecting member of the third connection interface are detachably engageable to permit the flexible shaft assembly to be disconnected from the second transmission.

8. The system of claim 7, wherein one of the first connecting member of the third connection interface and the second connecting member of the third connection interface is a threaded surface and the other of the first connecting member of the third connection interface and the second connecting member of the third connection interface is a threaded swivel nut.

9. The system of claim 7, wherein the first shaft coupling has a first cross-sectional area and is detachable from the second clutch coupling, the second shaft coupling has a second cross-sectional area and is detachable from the second transmission coupling, and the first cross-sectional shape and the second cross-sectional shape are generally identical to permit the flexible shaft assembly to detach from the clutch assembly and the second transmission and reconnect to the clutch assembly and the second transmission in an opposite orientation.

10. The system of claim 1, wherein the first clutch coupling has a first cross-sectional area and is detachable from the first transmission coupling, the first shaft coupling has a second cross-sectional area and is detachable from the second clutch coupling, and the first cross-sectional shape and the second cross-sectional shape are generally identical to permit the first shaft coupling to directly connect to the first transmission coupling.

11. The system of claim 1, wherein the flexible shaft assembly includes a flexible shaft casing that houses the flexible shaft.

12. The system of claim 1, wherein the clutch is a wrap spring clutch.

13. A system for transmitting power from a drive shaft to a seed meter shaft of a seeder, comprising:
  a first transmission including a first transmission coupling connected to one of the drive shaft or the seed meter shaft so as to rotate as the one of the drive shaft or the seed meter shaft rotates;
  a clutch assembly including:
    a first clutch coupling connected to the first transmission coupling so as to rotate as the first transmission coupling rotates, the first clutch coupling having a first cross-sectional shape;
    a second clutch coupling;
    a clutch connecting the first clutch coupling and the second clutch coupling such that the second clutch coupling is selectively connected to the first clutch coupling so as to selectively rotate as the first clutch coupling rotates;
  a flexible shaft assembly including:

a first shaft coupling connected to the second clutch coupling so as to rotate as the second clutch coupling rotates, the first shaft coupling having a second cross-sectional shape;
a flexible shaft connected to the first shaft coupling so as to rotate as the first shaft coupling rotates;
a second shaft coupling connected to the flexible shaft so as to rotate as the flexible shaft rotates;
a second transmission including a second transmission coupling connected to the second shaft coupling so as to rotate as the second shaft coupling rotates, and the second transmission coupling being connected to the other of the drive shaft or the seed meter shaft so as to rotate as the other of the drive shaft or the seed meter shaft rotates;
wherein the first clutch coupling is detachable from the first transmission coupling, the first shaft coupling is detachable from the second clutch coupling, and the first cross-sectional shape and the second cross-sectional shape are generally identical to permit the first shaft coupling to directly connect to the first transmission coupling, and
wherein the clutch assembly is substantially outside of the first transmission and the second transmission.

14. The system of claim 13, wherein the first clutch coupling and the first shaft coupling define a set of first couplings, the first transmission coupling and the second clutch coupling define a set of second couplings, and one of the set of second couplings or the set of first couplings are square shafts and the other of the set of second couplings and the set of first couplings are square shaft receivers.

15. The system of claim 13, wherein the second shaft coupling has a third cross-sectional area and is detachable from the second transmission coupling, and the second cross-sectional shape and the third cross-sectional shape are generally identical to permit the flexible shaft assembly to detach from the clutch assembly and the second transmission and reconnect to the clutch assembly and the second transmission in an opposite orientation.

16. The system of claim 13, wherein the flexible shaft assembly includes a flexible shaft casing that houses the flexible shaft.

17. The system of claim 13, wherein the clutch is a wrap spring clutch.

18. A system for transmitting power from a drive shaft to a seed meter shaft of a seeder, comprising:
a first transmission including a first transmission coupling connected to one of the drive shaft or the seed meter shaft so as to rotate as the one of the drive shaft or the seed meter shaft rotates;
a flexible shaft assembly including:
a first shaft coupling connected to the first transmission coupling so as to rotate as the first transmission coupling rotates, the first shaft coupling having a first cross-sectional shape;
a flexible shaft connected to the first shaft coupling so as to rotate as the first shaft coupling rotates;
a second shaft coupling connected to the flexible shaft so as to rotate as the flexible shaft rotates, the second shaft coupling having a second cross-sectional shape;
a second transmission including a second transmission coupling connected to the second shaft coupling so as to rotate as the second shaft coupling rotates, and the second transmission coupling being connected to the other of the drive shaft or the seed meter shaft so as to rotate as the other of the drive shaft or the seed meter shaft rotates;
wherein the first cross-sectional shape and the second cross-sectional shape are generally identical to permit the flexible shaft assembly to detach from the first transmission and the second transmission and reconnect to the first transmission and the second transmission in an opposite orientation.

19. The system of claim 18, further comprising a clutch assembly including:
a first clutch coupling connected to the first transmission coupling so as to rotate as the first transmission coupling rotates;
a second clutch coupling connected to the first shaft coupling so as to rotate as the first shaft coupling rotates; and
a clutch connecting the first clutch coupling and the second clutch coupling such that the second clutch coupling is selectively connected to the first clutch coupling so as to selectively rotate as the first clutch coupling rotates.

20. The system of claim 19, wherein the first clutch coupling and the first shaft coupling define a set of first couplings, the first transmission coupling and the second clutch coupling define a set of second couplings, and one of the set of first couplings and the set of second couplings are square shafts and the other of the set of first couplings and the set of second couplings are square shaft receivers.

* * * * *